May 22, 1956
J. NISENSON
2,746,316
THREE SPEED MOTOR DRIVE CONTROL
Filed Oct. 20, 1954
2 Sheets-Sheet 1
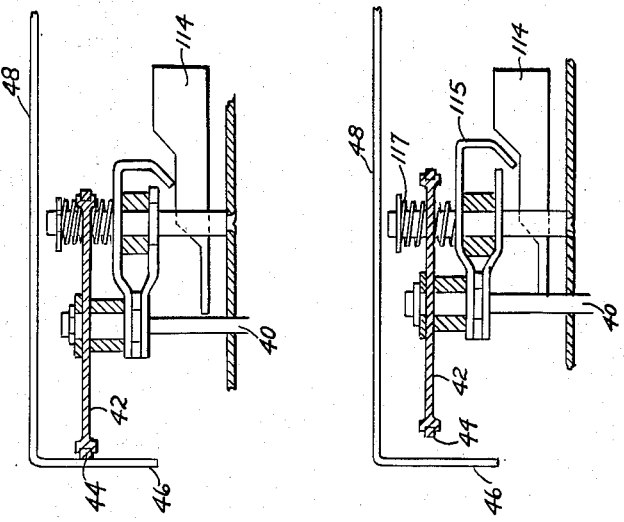
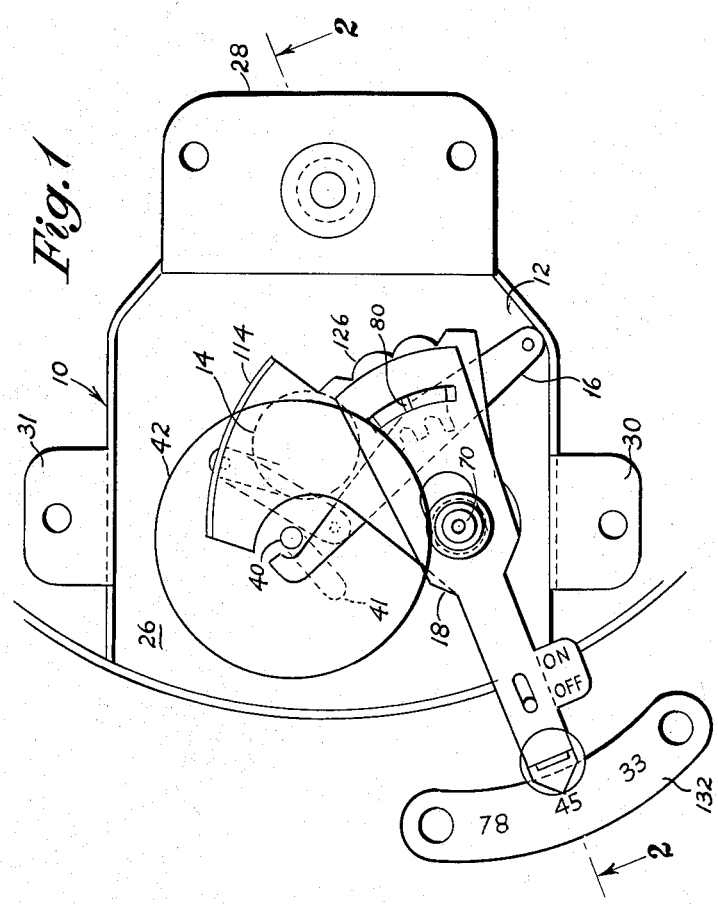
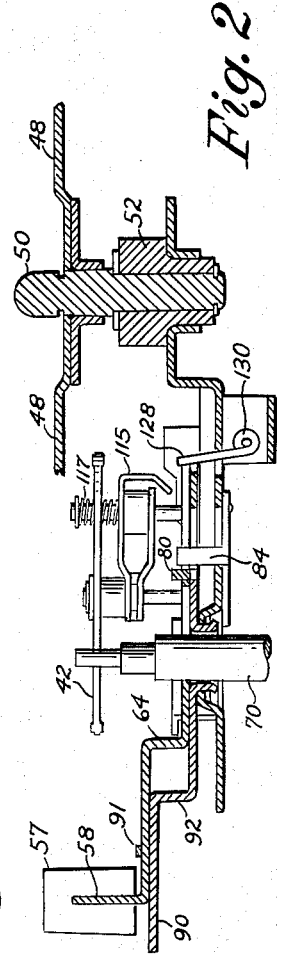

May 22, 1956          J. NISENSON          2,746,316
THREE SPEED MOTOR DRIVE CONTROL
Filed Oct. 20, 1954          2 Sheets-Sheet 2
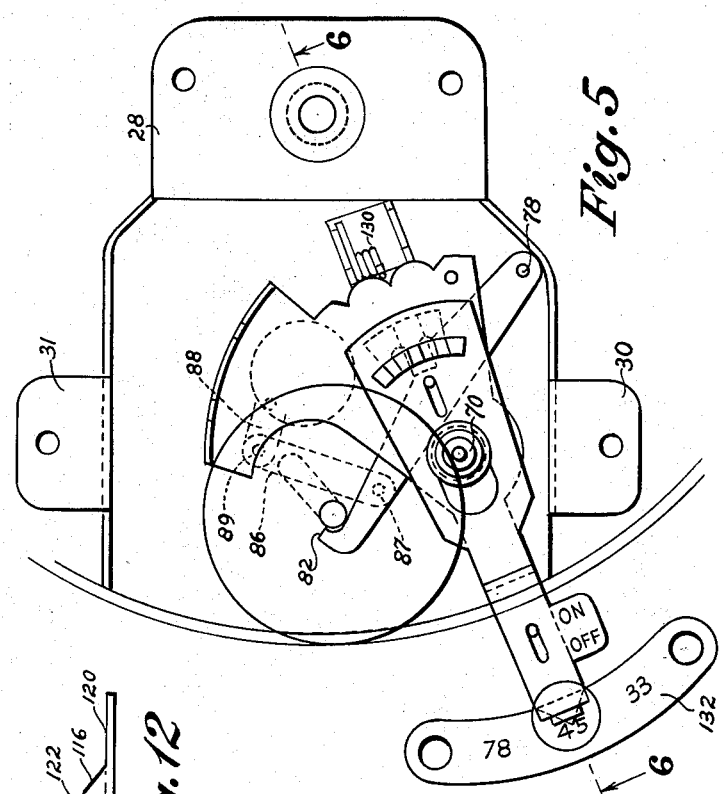
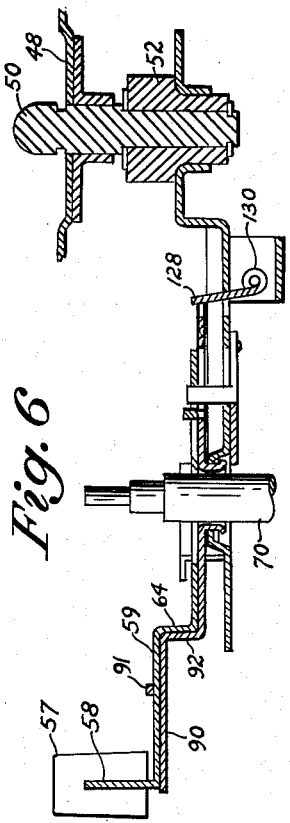
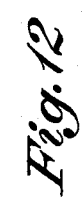
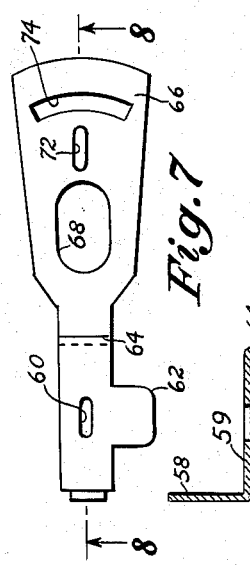
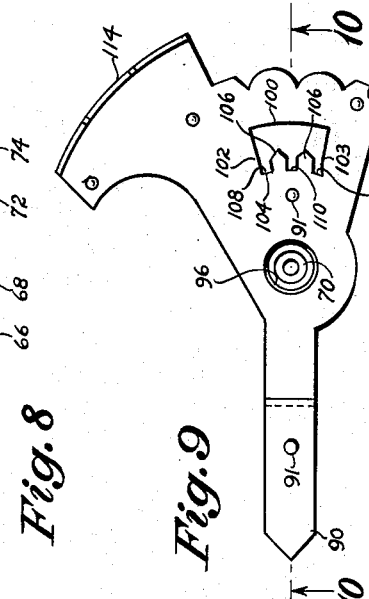
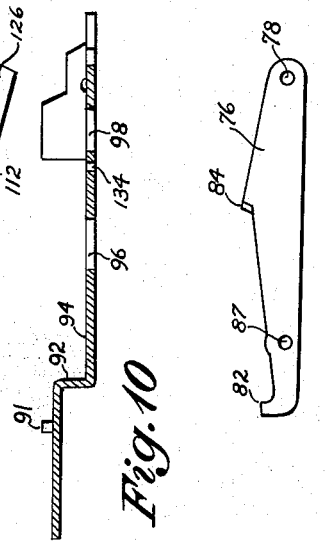

United States Patent Office 2,746,316
Patented May 22, 1956

2,746,316
THREE SPEED MOTOR DRIVE CONTROL

Jules Nisenson, Croton-on-Hudson, N. Y., assignor to Loral Electronics Corporation, New York, N. Y., a corporation of New York Application October 20, 1954, Serial No. 463,533

3 Claims. (Cl. 74—472)

This invention relates generally to the field of motor control devices, and more particularly to an improved form of three-speed motor control device adapted for use in conjunction with a phonograph turntable capable of rotating at a plurality of different speeds in a selective manner.

Such devices are known in the art, and normally include a driven wheel having a rubber or other resilient outer surface which is adapted to be pressed against a peripheral flange on the turntable during such time as the turntable is positively driven. Such devices are normally equipped with speed selective means which include a "rest" position wherein the driving wheel is withdrawn from contact with the peripheral flange of the turntable, so that flat portions on the rubber periphery of the driving wheel do not develop. Very often, the user is either ignorant of the presence of such a position, or inadvertently forgets to place the adjusting lever to the rest position after completion of a period of use of the device, so that the driving wheel continues to be resiliently pressed against the turntable flange, thereby developing the undesirable flat spots upon the outer surface of the rubber tire with which the driving wheel is provided. The presence of these flat spots causes an uneven rate of rotation of the turntable, thereby distorting the sound heard by the user of the phonograph. It is therefore among the principal objects of the present invention to provide a phonograph motor control in which the driving wheel is automatically disengaged from contact with the turntable flange upon the interruption of flow of current to the phonograph motor, so that the two normally separate operations are combined into a single operation.

Another object of the invention lies in the provision of a phonograph motor control device incorporating a provision for simultaneously interrupting the flow of current to the motor and disengaging the driving wheel from the turntable flange in which the number of moving parts has been reduced to a minimum, thereby permitting a relatively long, trouble-free useful life of the same.

A further object of the invention lies in the provision of phonograph motor control structure including the above-enumerated advantages in which the cost of fabrication may be of a reasonably low order, with consequent wide sale, distribution and use throughout the purchasing public.

Still another object of the invention lies in the provision of phonograph motor control structure which may be used in conjunction with existing types of phonograph motors and motor drives, thereby permitting the incorporation of the inventive structure into existing devices without extensive modification.

A feature of the invention lies in the fact that the entire device may be constructed substantially of metallic stampings, thereby eliminating the necessity of resorting to relatively expensive castings and/or forgings.

These objects and features, as well as other incidental ends and advantages, will become more clearly apparent during the course of the following disclosure, and be pointed out in the appended claims.

On the drawings, to which reference will be made in the specification, similar reference characters have been employed to designate corresponding parts throughout the several views.

Figure 1 is a fragmentary plan view of an embodiment of the invention.

Figure 2 is a fragmentary vertical sectional view as seen from the plane 2—2 on Figure 1.

Figure 3 is an enlarged fragmentary sectional view of the upper central portion of Figure 2 showing the engagement of the driving wheel with the turntable flange during a period of operation of the device.

Figure 4 is an enlarged fragmentary sectional view corresponding in most respects to that seen on Figure 3, but showing the driving wheel in a disengaged position with respect to the turntable flange.

Figure 5 is a fragmentary plan view of the embodiment corresponding in most respects to that seen on Figure 1, but showing the component parts therein in position corresponding to that seen on Figure 3.

Figure 6 is a fragmentary vertical sectional view as seen from the plane 6—6 on Figure 5.

Figure 7 is a plan view of a portion of the drive disconnecting element which comprises a part of the embodiment.

Figure 8 is a sectional view as seen from the plane 8—8 on Figure 7.

Figure 9 is a plan view of the speed change control element which comprises another part of the embodiment.

Figure 10 is a sectional view as seen from the plane 10—10 on Figure 9.

Figure 11 is a plan view of another part of the drive disconnecting element 16.

Figure 12 is a fragmentary view in elevation showing camming means which comprises a part of the speed change control element.

In accordance with the invention, the device, generally indicated by reference character 10, comprises broadly: a base plate element 12, a turntable drive element 14, a drive disconnecting element 16, and a speed change control element 18.

The base plate element 12 is preferably formed from a single metallic stamping, and includes a main body member 26, a turntable support member 28, and mounting tabs 30 and 31, which enable the same to be positioned by screw means (not shown).

The turntable drive element 14 may be of a generally conventional type, including a prime mover (not shown), gear train means indicated by the dotted lines 38 and a driving shaft 40 disposed within a slot 41 in the main body member 26 having mounted thereupon a driving wheel 42. As may be seen on Figures 3 and 4, the driving wheel is provided with a rubber tire 44 or neoprene band to provide a resilient interconnection between the driving wheel 42 and the flange 46 of the record supporting turntable 48. The turntable 48 may be of well-known configuration supported at the geometrical center thereof upon a pivot 50, in turn supported by a suitable bearing member 52 upon the turntable support member 28 of the base plate element 12.

The drive disconnecting element 16 is adapted to simultaneously move the driving wheel 42 from contact with the flange 46 and interrupt the flow of current to the prime mover. Referring to Figures 7 and 8 on the drawings, a knob engaging member 58 provides means for mounting the finger engaging member 57. The member 58 is connected to an outwardly disposed horizontal member 59 which incorporates a lost motion slot 60 which is positioned adjacent an indicating tab 62. An offset vertically disposed portion 64 interconnects the portion 59 with a second or inner portion 66 which is also substantially horizontally disposed. The portion 66 includes an elongated mounting slot 68 slidably and rotatably mounted upon a pintle 70 to permit relative motion therebetween including both rotational and translational components. Adjacent the mounting slot 68 is a second lost motion slot 72 disposed coaxially with the slot 60, as well as an arcuate slot 74 having a center curvature lying within the nearer end of the slot 68.

The shaft engagement member 76 of the element 16 may be seen on Figure 11, and is also preferably formed by a single stamping. The member 76 is mounted by pin means 78 upon the base plate element 12, as may be seen on Figures 1 and 5. At the end opposite the pin 78 is a claw 82 adapted to engage the shaft 40 to move the same within the slot 41 to result in the disengagement of the wheel 42 from the turntable flange 46. A vertically disposed tongue 84 is adapted to lie within the arcuate slot 74 when the device is assembled. The width of the tongue 84 is such that the same lightly contacts the arcuate edges of the slot.

Connected to the member 76 through pins 87 and 89 are switch links 86 and 88 which control switch means (not shown) actuating the prime mover. From a consideration of the above, it will be apparent that upon inward radial movement of the member 57, motion will be transmitted through the claw 82 to result in retracting the wheel 42, while simultaneously moving the links 86 and 88 to disconnect the prime mover.

The speed change control element 18 serves to shift the axial position of the shaft 40 in a vertical direction to permit the gear ratio between the prime mover means and the shaft to be adjusted for different rates of rotation whereby the rate of rotation of the turntable may be altered to accommodate different recording speeds. The changing of the position of the shaft 40 by means of a stepped cam is known in the art, and the present invention and disclosure is confined to the means whereby the cam is shifted by means of the same finger engaging member 57 which controls the above-described functions of the drive disconnecting element 16. Referring to Figures 9 and 10, the speed change control element 18 includes an outer portion 90 having pin means 91 extending in a vertical direction upwardly therefrom, and adapted to engage the slot 60. An offset vertical portion 92 interconnects the portion 90 with an inner horizontally disposed portion 94. A circular mounting hole 96 permits engagement of the element 18 with the pintle 70, and an irregularly shaped opening 98 is disposed so as to partially underlie the arcuate slot 74. A second pin 93 is adapted to engage the slot 72. As may be seen on Figure 9, the opening 98 is bounded by an arcuate side edge 100, rectilinear side edges 102 and 103, as well as a slotted edge 104. The edge 104 is provided with a plurality of guiding wedge portions 106 between the slots 108, 110 and 112 which are of a width sufficient to accommodate the vertical tongue 84 of the shaft engagement member 76.

The curvilinear cam 114 may be of a well known type in which a cam follower 115 is resiliently urged by a follower spring 117 to follow the outline delineated by the cam surfaces 116 and 118. When positioned for a given turntable speed, the follower normally rests upon supporting surfaces 120, 122 or 124, which contact results in the proper positioning of the gear train means (not shown) to achieve the desired gear reduction ratio between the prime mover and the turntable.

A notched or scalloped edge 126 is adapted to be engaged by the free end 128 of a torsion spring 130 which serves to maintain the speed change control element 18 in selected position as indicated by a plate 132 disposed beneath the finger engaging member 57.

Referring to Figures 2 and 6, the device is assembled with the speed change control element 18 disposed below the drive disconnecting element 16. In this position the pins 91 and 93 project into the slots 60 and 73, while the pintle 70 projects through the hole 96 and the slot 68. The shaft engaging member 76 is disposed below the elements 16 and 18. The vertically disposed tongue 84 passes through the irregularly shaped opening 98 to lie within the arcuate slot 74 as mentioned hereinabove.

When the device is not in use, the component parts assume the position shown on Figures 1 and 2 wherein the finger engaging member is moved centrally until the outward end of the slot 68 engages the pintle 70. In this position, motion has been transmitted through the edges of the slot 74 to the tongue 84 to result in movement of the shaft engagement members 76 in a clockwise direction, which in turn moves the shaft 40 within the slot 41 wherein the driving wheel 42 and tire 44 are moved from contact with the turntable flange 46, this position being shown on Figure 4 of the drawing. The movement simultaneously moves the links 86 and 88 to operate the switch means as described hereinabove.

In this position, the tongue 84 lies in that portion of the opening 98 wherein it is free of engagement with the slots 108, 110 and 112, and accordingly, the member 57 may be moved in an arcuate path above the plate 132 when it is desired to change the turntable speed. During such motion, the end 128 of the spring 130 is dislodged from the particular portion of the edge 126 with which it is engaged, to enter another notched portion simultaneous with the alignment of the tongue 84 with one of the above-mentioned slots 108, 110 or 112.

Upon reaching the new position, the prime mover may be again started and the driving wheel 42 again brought into resilient contact with the turntable flange 46, as shown on Figure 3 by moving the member 57 in a direction toward the plate 132 wherein the parts assume the relative positions shown on Figure 5. In each case, moving the finger engaging member 57 toward the center of rotation of the turntable results in stopping the prime mover and simultaneously disconnecting the driving wheel from the turntable flange. When in this position, and only in this position, the device may be adjusted for turntable rotation at a different rate, after which the driving wheel is again engaged with the turntable flange, and the operation of the prime mover resumed. During the return motion, the tongue 84 becomes securely positioned within one of the slots 108, 110 or 112, so that a subsequent change of turntable speed can occur only by repeating the operation just described.

It may thus be seen that I have invented novel and highly useful improvements in multi-speed motor drive controls, in which there has been provided structure assuring that the drive wheel will be disengaged from the turntable flange when the phonograph turntable with which the same is associated is not in use. The device includes relatively few moving parts, and may be fabricated using techniques and equipment already known in the art, and at a cost comparable with conventional control devices.

I wish it to be understood that I do not consider the invention limited to the exact details of structure shown and set forth in this specification, for obvious modifications will occur to those skilled in the art to which the present invention pertains.

I claim:

1. Phonograph motor control construction for use in conjunction with an electrically operated prime mover, a rotatably mounted turntable, and a resilient driving wheel driven by said prime mover and intermittently engageable with said turntable, said construction comprising: first circuit breaking means controlling the flow of current to said prime mover and second driving wheel engagement means serving to shift the axis of said driving wheel so that the same is disengaged with respect to said turntable; and third means for substantially simultaneously operating said first and second means whereby the flow of current to said prime mover and the moving of said driving wheel out of contact with said turntable are accomplished as a single operation, the means for shifting the axis of said driving wheel including a lever pivotally mounted at a first end thereof, and having a claw engageable with a shaft upon which the driving wheel is mounted.

2. Phonograph motor control construction for use in conjunction with an electrically operated prime mover, a rotatably mounted turntable and a resilient driving wheel mounted upon a shaft driven by said prime mover and intermittently engageable with said turntable, said construction comprising: a drive disconnecting element and a speed change element; said drive disconnecting element including a first lever mounted for rotational and translational motion with respect to a relatively fixed pintle; said speed change element including a second lever having cam means thereupon mounted upon said pintle for coaxial rotation with said drive disconnecting element and interconnected therewith through lost motion means whereby rectilinear movement of said first lever in a given direction may serve to simultaneously interrupt the flow of current to said prime mover, and disengage said driving wheel from said turntable, and rotational movement of said first lever may serve to shift the position of the cam means on said second lever to result in shifting the driving wheel shaft axially.

3. Phonograph motor control construction for use in conjunction with an electrically operated prime mover, a rotatably mounted turntable and a resilient driving wheel mounted upon a shaft driven by said prime mover and intermittently engageable with said turntable, said construction comprising: a drive disconnecting element and a speed change element; said drive disconnecting element including a first lever mounted for rotational and translational motion with respect to a relatively fixed pintle; said speed change element including a second lever having cam means thereupon mounted upon said pintle for coaxial rotation with said drive disconnecting element and interconnected therewith through lost motion means whereby rectilinear movement of said first lever in a given direction may serve to simultaneously interrupt the flow of current to said prime mover, and disengage said driving wheel from said turntable, and rotational movement of said first lever may serve to shift the position of the cam means on said second lever to result in shifting the driving wheel shaft axially; and means to prevent rotation of said first lever when said driving wheel is in engaged position with respect to said turntable.

References Cited in the file of this patent
UNITED STATES PATENTS
2,588,807   Da Costa _____ Mar. 11, 1952